Figure 1:
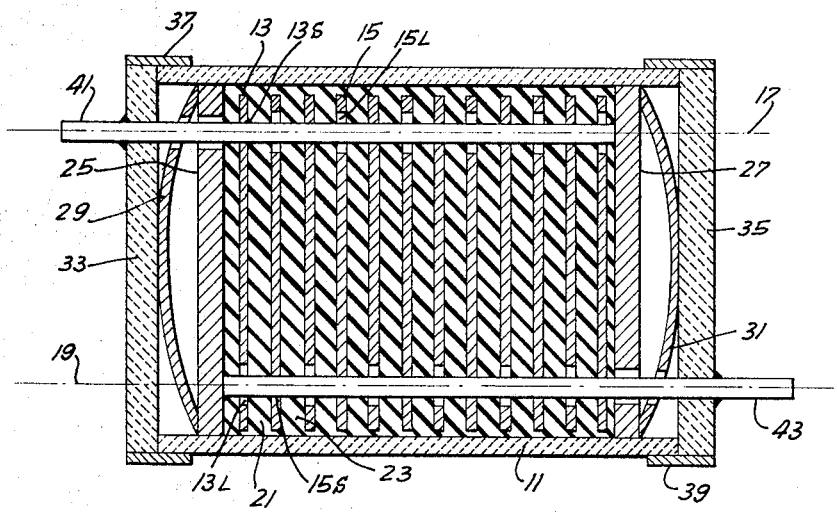

Oct. 11, 1966  J. M. BOOE ET AL  3,278,815
ELECTRICAL CAPACITOR WITH A BORON NITRIDE DIELECTRIC
Filed Jan. 11, 1961

INVENTORS.
JAMES M. BOOE
JOSEPH T. HOOD
BY
ATTORNEY

United States Patent Office 3,278,815
Patented Oct. 11, 1966

3,278,815
ELECTRICAL CAPACITOR WITH A BORON NITRIDE DIELECTRIC
James M. Booe and Joseph T. Hood, Indianapolis, Ind., assignors to P. R. Mallory & Co., Inc., Indianapolis, Ind., a corporation of Delaware
Filed Jan. 11, 1961, Ser. No. 81,979
2 Claims. (Cl. 317—258)

The invention relates to electrical capacitors capable of withstanding extremely adverse environmental conditions of temperature and nuclear radiation, and is particularly concerned with capacitors which employ compacted powdered insulating materials to achieve such capability.

In many different areas of modern technology electrical and electronic components are required which can withstand environmental conditions of heretofore prohibitive severity. For example, in jet aircraft and spacecraft such components may have to withstand temperatures ranging from −150° F. up to nearly 1,000° F. In nuclear power applications conditions of equally high temperatures as well as intense bombardment by neutron and gamma rays may be encountered. Although extensive effort has been devoted to developing components adapted for use under these and similarly rigorous conditions the results as yet have been quite limited, e.g. ceramic vacuum tubes and a few types of transformers.

The development of an electrical capacitor capable of operating at temperatures up to about 1,000° F. is a particularly difficult problem because the insulating material employed must provide a higher order of dielectric performance than required in any other type of circuit component. Since the resistivity and dielectric strength of all known insulating materials rapidly decrease with increasing temperature, prior attempts to construct such a capacitor have fallen far short of the foregoing temperature level.

Accordingly, an object of the invention is to provide an electrical capacitor which retains both high insulation resistance and high dielectric strength under extremely adverse environmental conditions of temperature and exposure to nuclear radiation.

A further object is to provide an electrical capacitor employing a compacted powdered ceramic insulating material and a physical structure rendering it capable of withstanding highly adverse environmental conditions.

A further object is to provide methods of making a capacitor structure comprising a compacted powdered ceramic insulating material and which is capable of withstanding highly adverse environmental conditions.

In one embodiment of an electrical capacitor in accordance with the invention, capable of withstanding highly adverse environmental conditions, it comprises a cylindrical insulating tube with a plurality of conductive disc electrodes stacked in longitudinal succession therein. A plurality of layers of insulating material are respectively interleaved between and separate successive ones of the electrodes from each other. The capacitor further comprises a pair of conductive cylindrical bars longitudinally extending within the insulating tube and respectively passing through alternate ones of the electrodes so as to make peripheral electrical contact therewith, the periphery of each bar being transversely spaced from the electrodes in contact with the other bar. A pair of seals affixed at opposite ends of the tube retain the stack of electrodes and layers of insulating material therein, each of the cylindrical bars longitudinally extending through at least one of the seals so as to provide together a pair of connection terminals for the capacitor.

Figure 2:
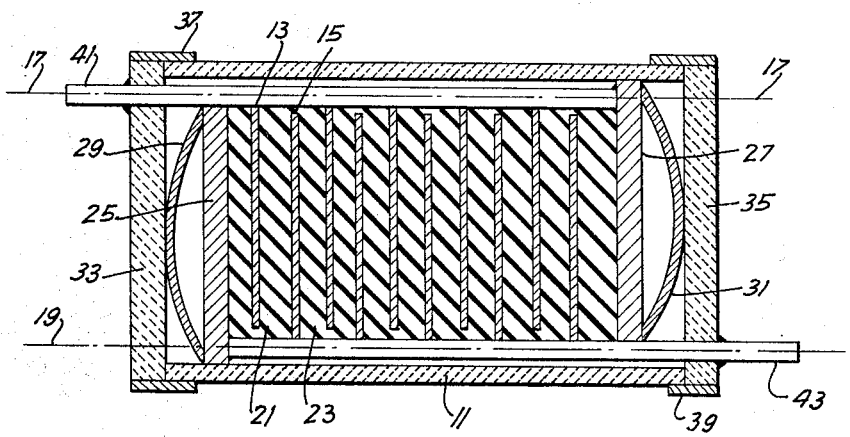

A more detailed description of capacitors and processes in accordance with the invention is presented in the following specification and accompanying drawings, but it should be noted that the true scope of the invention is actually pointed out in the ensuing claims. In the drawings:

FIG. 1 is a sectional view of one type of capacitor constructed in accordance with the invention; and
FIG. 2 is a sectional view of another type of capacitor constructed in accordance with the invention.

CAPACITOR ELECTRICAL CHARACTERISTICS

Capacitor applications impose much greater restrictions on dielectric materials than any other electronic component due to the great area of thin sections involved. Therefore, the dielectric characteristics which favor the choice of a material are:

(a) High specific resistance $R_v$.
(b) High dielectric constant K.
(c) High dielectric strength $S_d$.
(d) Low dielectric loss (dielectric absorption and dielectric hysteresis).

These characteristics affect the size, weight and cost as well as the quality of a capacitor. Their relative importance varies with the voltage and capacitance rating and the environmental and application requirements for which the capacitor is intended. The type of capacitor to which the present invention is primarily directed is one capable of operation at relatively high voltages (up to about 3,000 volts) and high temperatures (up to about 500° C.) at nominal capacitance of the order of a few microfarads.

The size and weight of a capacitor, as well as the quantity of material employed, are affected by the dielectric constant K and dielectric strength $S_d$ of the dielectric material employed. However, in the case of a capacitor having a relatively high voltage rating the value of $S_d$ is of far greater importance than a high K value.

The insulation resistance $R_i$ (ohm-microfarads) of a capacitor is independent of the thickness of the dielectric employed for any specific dielectric material, as may be seen from the fact that the ohmic resistance R is given by $$R = R_v T/A \quad (1)$$

and the capacitance C is given by $$C = \frac{8.85 \times 10^{-8} K \times A}{T} \text{ microfarad} \quad (2)$$

where $R_v$ is the volume resistivity of the dielectric material in ohm-centimeters, T is its thickness in centimeters, A is the total area in square centimeters, and K is the dielectric constant. Taking the product of R and C, which is the insulation resistance $R_i$ $$R_i = RC = 8.85 \times 10^{-14} K \times R_v \text{ megohm-microfarads} \quad (3)$$

From Equation 3 it is clear that the insulation resistance $R_i$ is completely determined by the dielectric constant K and the specific resistivity $R_v$, and is not affected by the thickness of the dielectric. The thickness of the dielectric does, however, affect the breakdown voltage $V_b$ of the capacitor in accordance with the relation $$V_b = T \times S_d \qquad (4)$$

The volume and weight of dielectric material required for any specified product of voltage and capacitance, or insulation resistance, will therefore be inversely proportional to the square of the dielectric strength ($V_b^2$).

The foregoing considerations lead to the conclusion that a dielectric material of high specific resistivity and high dielectric strength at elevated temperatures will be preferable for the purposes of the present invention to a dielectric material having a higher dielectric constant but lower dielectric strength. Thus, although the dielectric constant of boron nitride (BN) is only about 4, while other dielectric materials such as aluminum oxide ($Al_2O_3$) may have dielectric constants of 9 or more, boron nitride is preferable because it has a far higher specific resistivity and dielectric strength at 500° C. than any other presently known material.

CAPACITOR STRUCTURE

Referring now to FIG. 1, there is illustrated an embodiment of a capacitor which, in accordance with the invention, is capable of withstanding highly adverse environmental conditions. It comprises a cylindrical insulating tube 11 of a material possessing high dielectric strength, ability to withstand high temperatures, and reasonable mechanical strength. Ceramics such as forsterite, quartz, steatite and alumina are each satisfactory, with alumina having been found preferable. Stacked in longitudinal succession within tube 11 are a plurality of conductive disc electrodes 13, 15, etc. These should have flat transverse surfaces and preferably be very thin (i.e. 0.002 inch thick) in order to provide good heat dissipation in the longitudinal direction. They should be constructed of metals having low thermal expansion, high mechanical strength, and good brazability. Steel, stainless steel, nickel, iron, Monel, Inconel, molybdenum, and tantalum have been found satisfactory, with tantalum being preferred for its highly refractory characteristics when hot pressing is employed as described hereinafter. All the disc electrodes may be of the same transverse configuration and may each bear a longitudinal aperture therein of the same transverse dimensions, the electrodes being stacked so the apertures of successive ones thereof are alternately aligned on opposite ones of a pair of transversely separated longitudinal axes. More specifically, as illustrated by the construction in FIG. 1, each disc electrode may bear a larger and a smaller longitudinal aperture therein respectively of transverse dimensions and at relative transverse spacings which are the same for all electrodes. These apertures are preferably located adjacent diametrically opposite portions of the periphery of each electrode. The electrodes are longitudinally stacked in tube 11 so the larger and smaller apertures of successive ones are alternately aligned on opposite ones of the longitudinal axes referred to. For example, the larger and smaller apertures 15L and 15S of electrode 15 are respectively coaxially aligned on longitudinal axes 17 and 19. The immediately preceding electrode 13, on the other hand, has its smaller aperture 13S aligned on axis 19 and its larger aperture 13L aligned on axis 17.

The capacitor of FIG. 1 further comprises a plurality of layers of insulating material such as layers 21, 23, etc., in the foregoing stack interleaved between and insulating successive ones of the electrodes from each other. Thus, insulating layer 21 is interleaved between and separates successive electrodes 13 and 15 from each other. These layers preferably extend completely to the interior surface of tube 11, filling all the space in the tube between the electrodes. Each insulating layer may have a pair of longitudinal apertures drilled therein respectively aligned on the longitudinal axes 17 and 19 and of the same transverse dimensions as the smaller electrode apertures, each layer comprising a powdered dielectric which has been compacted to a predetermined density. More specifically, the insulating material employed may be a compacted powdered ceramic dielectric selected from the class consisting of the oxides and nitrides of magnesium, aluminum, silicon and boron. As indicated above, boron nitride is preferable because it has high insulation resistance and adequate mechanical strength at high temperatures even when compacted to only about 80 percent of its theoretical density of 2.1 gm./cc. This is important because when compacting is achieved by cold pressing the powdered material considerable bursting pressure is placed on ceramic tube 11. If the pressure is too high it may cause the tube to fracture. The powder employed must therefore attain the requisite characteristics at the density permitted by the maximum compacting pressure which tube 11 can withstand. This limits the choice of suitable dielectric, since the great majority of those capable of high temperature performance suffer markedly in insulating properties unless in a substantially non-porous almost solid condition. In order to alleviate the high compacting pressures required, thereby placing less stress on insulating tube 11, each layer of insulating material may comprise a mixture of powdered ceramic dielectric material such as boron nitride with a fusible powdered binder material, such mixture having been bonded together into a substantially solid integral mass. A hot pressing process for achieving such fabrication is described in more detail hereinafter. The powdered binder material should have the properties of reasonably low melting point, good dielectric performance, and the facility of bonding to the dielectric powder so that upon cooling and solidification the latter is bonded into a substantially solid mass. Binder materials selected from the class of compounds of boron and oxygen have been found to serve very well, boron oxide and magnesium orthoborate being preferable. These binders may be used not only with the preferred boron nitride dielectric, but also with any of the other dielectrics in the class indicated above.

To retain the stacked assembly of disc electrodes and insulating layers, as described, a pair of seals may be affixed at opposite ends of insulating tube 11. Such seals are preferably adapted to exert longitudinal pressure on the stacked assembly in order to prevent mechanical displacement or delamination due to temperature cycling, shock or vibration. They may respectively comprise respective ones of a pair of rigid metal terminal plates 25 and 27 journalled within opposite ends of tube 11 against the corresponding ends of the stacked assembly therein. The plates are respectively held in place by respective ones of a pair of disc or spider spring washers 29 and 31 which are compressed by respective ones of end caps 33 and 35 which close off the ends of tube 11. For operation at the maximum possible temperatures these springs should be of refractory metals such as "Inconel," tungsten, molybdenum, or tungsten-tantalum alloys. For such operation the end caps 33 and 35 should be made of a ceramic material, but they may be metal when less extreme temperatures and lower breakdown voltage levels are anticipated. The annular peripheral edge of each end cap is preferably hermetically joined to the corresponding end of tube 11 by brazing. For this purpose the annular peripheral ends of tube 11 may be metallized either with a metal or alloy, the peripheral edges of the caps being similarly metallized when ceramic caps are employed. Either as an alternative or supplement to the foregoing mode of cap bonding, the ends of tube 11 may be respectively provided with short metal sleeves or rings 37 and 39 bonded to and slightly projecting therefrom. End caps 33 and 35 can then be respectively fitted within and brazed to the inner surface of such rings or sleeves.

The capacitor of FIG. 1 additionally comprises a pair of conductive cylindrical connecting bars 41 and 43 longitudinally extending within tube 11 and respectively passing through alternate ones of the stacked electrodes so as to make peripheral electrical contact therewith, the periphery of each bar being transversely spaced from the electrodes in contact with the other bar. Each connecting bar also extends through at least one of the end seals of tube 11 so as to provide together a pair of connection terminals for the complete capacitor. More specifically, as shown in FIG. 1 the bars 41 and 43 may respectively extend coaxially along longitudinal axes 17 and 19 through the electrode apertures on the corresponding axis and through opposite ones of the end seals of tube 11. In order to achieve good electrical contact with the appropriate alternate electrodes, the transverse cross-section of each of connecting bars 41 and 43 may be of nearly the same dimensions as the smaller electrode apertures so that it tightly journals the electrodes whose smaller apertures are on its axis. The periphery of each bar will thus be transversely spaced from contact with the electrodes whose larger apertures lie on its axis. For this reason each bar will necessarily have to be very straight. In addition, assuming that the electrode apertures are circular, the diameter of the bars must be very precise so as to assure good peripheral contact. A more positive mode of effecting good electrical contact may be to provide each connecting bar with a smooth uniform coating of a suitable brazing metal or alloy having a melting point below that of the bars and the electrodes. The stacked assembly may then be heated in a furnace or induction coil to melt the brazing alloy, thereby bonding the edges of each of the smaller electrode apertures to the connecting bar journalled therein. The connecting bars may be made of the same metals or alloys as the disc electrodes. For surface brazing thereof they may be coated with metals or alloys such as nickel phosphide, copper or copper alloys, copper-titanium hydride powder, and gold and gold alloys may be employed. Silver or silver alloys are not recommended because of the danger of silver migration due to local electrolytic action. It is plain that each connecting bar and the smaller aperture in each electrode may be correspondingly threaded to insure good contact before effecting brazing as described. It is also apparent that the apertures and the connecting bars can have other than circular transverse shapes, e.g. oblong, flat or cruciform.

The capacitor structure of FIG. 1 is particularly adapted to use identical circular disc electrodes of slightly smaller diameter than the inner wall of a circular cylindrical insulating tube 11, all the electrodes being coaxially stacked within the tube and each bearing two apertures therein which are preferably diametrically opposite and adjacent the edge of the electrode. However, it is equally feasible to construct basically the same type of capacitor structure with electrodes which have only one or even no apertures therein. Thus, in the capacitor structure shown in FIG. 2 the disc electrodes have no apertures and are not all coaxial with each other within the insulating tube 11.

CAPACITOR OF FIG. 2

The capacitor of FIG. 2 is closely similar to that of FIG. 1, corresponding elements having been similarly identified. However, in the structure employed in FIG. 2 the longitudinal connecting bars 41 and 43 respectively extend within tube 11 coaxially along longitudinal axes 17 and 19 which are adjacent diametrically opposite portions of the inner wall of the tube, the portion of the surface of each bar adjacent the wall preferably being bonded thereto. The various disc electrodes 13, 15, etc., are all of the same transverse dimensions and are longitudinally stacked within tube 11 so the peripheral edges of successive ones thereof are in transverse contact with alternate ones of connecting bars 41 and 43. In each case they are transversely separated from contact with the remaining connecting bar. Thus, the peripheral edge of electrode 13 transversely abuts connecting bar 41 but no portion of its periphery touches connecting bar 43. The peripheral edge of the succeeding electrode 15 transversely abuts connecting bar 43 but no portion of its periphery touches connecting bar 41. As in FIG. 1, a plurality of layers 21, 23, etc., of insulating material are interleaved between and insulate successive ones of the stacked disc electrodes from each other.

It is clear that this capacitor construction is simpler than that of FIG. 1. Besides dispensing with the apertures in the disc electrodes, no apertures are required in the terminal plates 25 and 27 or spring washers 29 and 31 comprised in the seals at opposite ends of tube 11. The omission of electrode apertures also results in maximum utilization of the available surface area of each electrode to contribute to the resultant total capacitance. However, it must be recognized that this type of construction results in considerably less insulation thickness in the electrical path between each successive pair of electrodes than in the type of construction in FIG. 1. Consequently, this embodiment of the invention is not adapted for use at as high voltages and temperatures as that of FIG. 1.

Although the invention has been described with reference to various specific embodiments thereof, both as to its structure and method, it will be apparent to those skilled in the art that many modifications and variations may be employed without departing from the true teachings and scope of the invention as defined by the ensuing claims.

What is claimed is:

1. A capacitor capable of withstanding adverse environmental conditions, said capacitor comprising: a cylindrical insulating tube; a plurality of conductive disc electrodes stacked in longitudinal succession within said tube; a plurality of layers of insulating material in said stack respectively interleaved between and separating successive ones of said electrodes from each other, said insulating material comprising a bonded mixture of powdered boron nitrode and a powdered binder comprising magnesium orthoborate; a pair of conductive cylindrical bars longitudinally extending within said tube and respectively passing through alternate ones of said electrodes so as to make peripheral electrical contact therewith, the periphery of each of said bars being transversely spaced from the electrodes in contact with the other bar; and a pair of seals affixed at opposite ends of said tube for retaining said stack of electrodes and layers of insulating material therein, each of said bars longitudinally extending through at least one of said seals so as to provide together a pair of connection terminals for said capacitor.

2. A capacitor capable of withstanding adverse environmental conditions, said capacitor comprising: a cylindrical insulating tube; a plurality of conductive disc electrodes stacked in longitudinal succession within said tube; a plurality of layers of insulating material in said stack respectively interleaved between and separating successive ones of said electrodes from each other, said insulating material comprising a bonded mixture of powdered boron nitride and a powdered binder comprising boron oxide; a pair of conductive cylindrical bars longitudinally extending within said tube and respectively passing through alternate ones of said electrodes so as to make peripheral electrical contact therewith, the periphery of each of said bars being transversely spaced from the electrodes in contact with the other bar; and a pair of seals affixed at opposite ends of said tube for retaining said stack of electrodes and layers of insulating material therein, each of said bars longitudinally extending through at least one of said seals so as to provide together a pair of connection terminals for said capacitor.

(References on following page)

References Cited by the Examiner

UNITED STATES PATENTS

| | | | |
|---|---|---|---|
| 923,923 | 10/1909 | Newton | 317—261 |
| 925,165 | 6/1909 | Everest | 317—261 |
| 1,386,008 | 8/1921 | McCulloch | 317—258 |
| 1,843,622 | 2/1932 | Norton | 317—261 |
| 2,398,088 | 4/1946 | Ehlers | 317—258 |
| 2,704,880 | 3/1955 | Brennan | 29—25.42 |
| 2,750,657 | 6/1956 | Horton | 317—258 |
| 2,777,976 | 1/1957 | Brafman | 317—261 |
| 2,861,321 | 11/1958 | Barnard | 29—25.42 |

OTHER REFERENCES

Birks, J. B.: "Modern Dielectric Materials," Heywood Co., London, 1960, pp. 169–170.

LEWIS H. MYERS, *Primary Examiner.*

SAMUEL BERNSTEIN, DARRELL L. CLAY, JOHN F. BURNS, *Examiners.*

J. D. KALLAM, W. F. ZAGURSKI, E. GOLDBERG, *Assistant Examiners.*